United States Patent [19]

Hundt

[11] 3,835,951

[45] Sept. 17, 1974

[54] SEMITRAILER-LIKE MOTOR VEHICLE WITH AIR CUSHION TRAILER FOR TRANSPORTATION OF LOADS

[75] Inventor: Eberhard Hundt, Stuttgart, Germany

[73] Assignee: Daimler-Benz Aktiengesellschaft, Stuttgart-Unterturkheim, Germany

[22] Filed: Dec. 23, 1971

[21] Appl. No.: 211,536

[30] Foreign Application Priority Data

Dec. 23, 1970 Germany.......................... 2063479

[52] U.S. Cl................ 180/119, 280/81 R, 280/480, 280/421
[51] Int. Cl.............................................. B60v 3/02
[58] Field of Search .......... 180/116, 119, 117, 125, 180/126, 124; 280/81 R, 400, 480, 421; 415/102

[56] References Cited
UNITED STATES PATENTS

| | | |
|---|---|---|
| 3,231,176 | 1/1966 | Bowen ............................... 415/102 |
| 3,248,086 | 4/1966 | Cockerell ........................... 180/124 |
| 3,298,706 | 1/1967 | Lyall ................................. 280/81 R |
| 3,434,560 | 3/1969 | Rockwell ........................... 180/119 |
| 3,444,951 | 5/1969 | Hopkins ............................. 180/119 |
| 3,698,499 | 10/1972 | Albertson .......................... 280/81 R |

*Primary Examiner*—Kenneth H. Betts
*Attorney, Agent, or Firm*—Craig & Antonelli

[57] ABSTRACT

A semitrailer-like motor vehicle for the transportation of loads, for example, of containers in which the load carrier is constructed in the manner of an air cushion vehicle and the towing vehicle includes a blower driven from an internal combustion engine for producing the air cushion of the semitrailer-like load carrier; the towing vehicle is so connected with the load carrier that the pressurized air and driving forces can be transmitted; the load carrier includes also a trailing axle structure with wheels thereon adapted to be braked.

25 Claims, 4 Drawing Figures

PATENTED SEP 17 1974 3,835,951

SEMITRAILER-LIKE MOTOR VEHICLE WITH AIR CUSHION TRAILER FOR TRANSPORTATION OF LOADS

The present invention relates to a semitrailer-like motor vehicle for the transportation of loads, for example, of containers on a trailer supported on an air cushion. Consequently, the present invention relates to an arrangement in which the load is received and absorbed by a load carrier, properly speaking, which, in its turn, is pulled by a towing vehicle suitable for cross country drive which has tires with small specific abutment pressure.

Semitrailer-truck combinations of the aforementioned type are known as such in the prior art. They are constructed in principle with several axles. It is possible in this manner to carry out the transportation with relatively slight ground pressure. The practical realization, however, involves difficulties when the transport is to take place off good roads, e.g., on poorer sideroads, etc.

The present invention is concerned with the task to provide a vehicle which is suited for receiving heavy loads with slight ground pressure, is well steerable and is not tied to good roads. The underlying problems are solved according to the present invention in that the load carrier, properly speaking, is constructed in the manner of a conventional air cushion-vehicle and in that the driving tractor carries the blower for producing the air cushion and is connected with the load carrier in such a manner that pressurized air and towing forces can be transmitted and in that the load carrier includes a trailing axle.

With the vehicle constructed in accordance with the present invention, heavy loads can be accepted and can be transported with good steerability and smallest ground pressure over terrain which in part is without good roads. Consequently, these vehicles of the present invention are not restricted to roads or certain transport routes.

Separate engines are provided for the driving tractor and the blower. Internal combustion engines of conventional construction or conventional gas turbines may be used as driving engines. The fuel supply taken along and possibly the cooling may be provided in common for both engines, the latter above all for the purpose of the good starting behavior of the blower engine. The essential of the proposal according to the present invention resides in that the semitrailer tractor, i.e., the driving vehicle carries the blower engine together with all installations necessary therefor.

It is additionally proposed according to the present invention that the connection between driving tractor and load carrier is detachable by conventional means. Generally a separate connection of tractional forces and compressed air is contemplated. However, according to another inventive concept the possibility also exists that the hose connection transmitting the pressurized air serves simultaneously also for the transmission of tractional and braking forces. One could utilize therefor, for example, a spring bellows with corresponding damping.

A further feature of the present invention resides in that the load carrier has an essentially flat loading surface or a loading surface enclosed by a box and roof and a conventional circumferential apron or skirting of elastic material, for example, of rubber, and in that the load carrier also includes support members of conventional construction which are provided with rollers or wheels and which are used above all during braking and parking. This has the purpose that the truck trailer combination can be braked safely.

It is additionally proposed in accordance with the present invention that trailing axle is guided at the rear end of the load carrier on guide members of any conventional construction and is springily supported with respect to the load carrier and also equipped with brakes at the wheels. A solution is thereby preferred in accordance with the present invention according to which the track of the trailing axle is at least as wide as the load carrier itself. The wheels at the trailing axle may be disposed outwardly in a conventional manner, however, they may also be more or less uniformly distributed over the entire axle width. In one embodiment of the present invention, the load carrier is wider than the driving tractor.

Accordingly, it is an object of the present invention to provide a truck trailer combination which avoids the aforementioned shortcomings and drawbacks encountered in the prior art.

Another object of the present invention resides in a semitrailerlike motor vehicle which can be driven also over terrain other than major thruways or similar good roads.

A further object of the present invention resides in a vehicle which is suitable for transporting heavy loads with slight ground pressure, yet is well steerable and maneuverable and not tied to good roads.

Still a further object of the present invention resides in a semitrailer-like motor vehicle of the type described above which can be braked safely.

These and other objects, features and advantages of the present invention will become more apparent from the following description when taken in connection with the accompanying drawing which shows, for purposes of illustration only, two embodiments in accordance with the present invention, and wherein.

Figure 1:
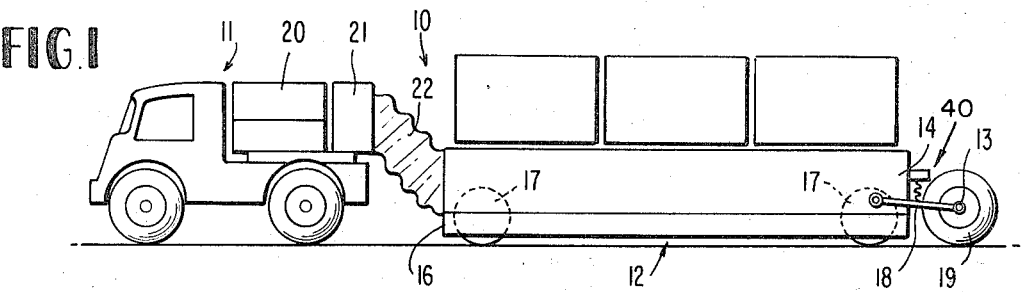
FIG. 1 is a schematic side view of one embodiment of a motor vehicle in accordance with the present invention.
Figure 2:
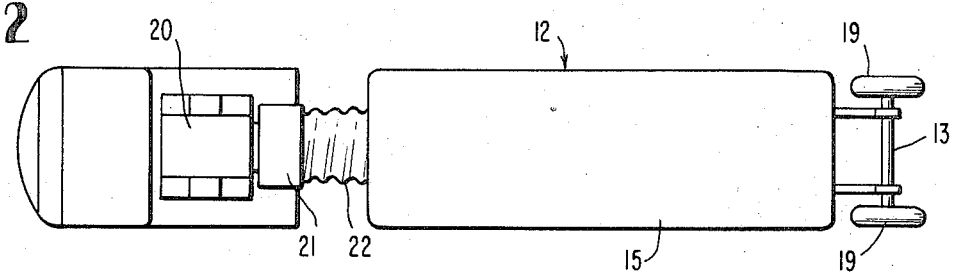
FIG. 2 is a schematic top plan view of the vehicle of FIG. 1.

Referring now to the drawing wherein like reference numerals are used throughout the various views to designate like parts, and more particularly to FIGS. 1 and 2, the entire vehicle generally designated by reference numeral 10 and illustrated in these two figures consists of the driving tractor generally designated by reference numeral 11 and of the load carrier generally designated by reference numeral 12 which is equipped at its rear end with a trailing axle 13. The load carrier 12 is constructed as air cushion vehicle and its body 14, which in this case includes a flat loading surface 15, is provided at the bottom thereof with a circumferential apron 16 of rubber or the like. Since the construction of such air cushion vehicle is known as such and forms no part of the present invention, a detailed description and showing thereof is dispensed with herein. Support rollers or support wheels 17 are arranged at the body 14, which, above all, absorb the weight of the load carrier 12 inclusive its load when the load carrier 12 is parked on a road or the like. The trailing axle 13 has essentially the same width as the load carrier 12. It is guided by means of conventional guide members 18 and is spring supported with respect to the load carrier 12 by spring members 40, for example, by means of a torsion rod. The wheels 19 are equipped with conventional brakes which is also the case for the rollers or wheels of the support members 17.

An internal combustion engine 20 is arranged on the driving tractor 11, which drives a blower 21. A connecting hose 22 conducts the blower air to the load carrier 12 and from there underneath the apron 16 so that the load carrier 12 is lifted in a conventional manner and is suspended on an air cushion, as is known. The connecting hose 22 can be constructed as spring bellows with corresponding damping and can thereby also transmit the traction and/or braking forces. Normally, however, conventional trailer couplings (not shown) are provided for the transmission of these forces.

Figure 3:
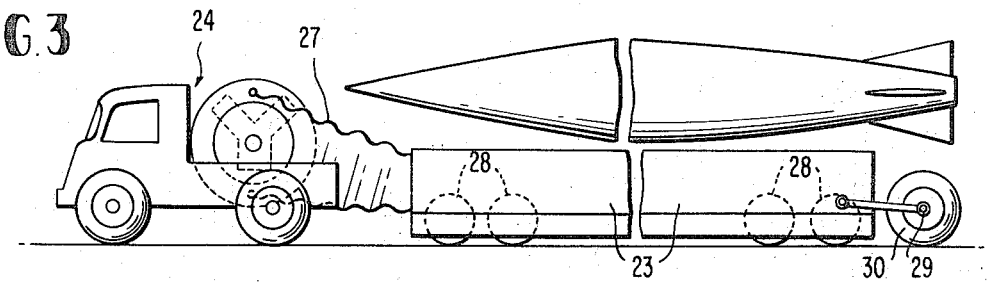
FIG. 3 is a schematic side view of a modified embodiment of a vehicle in accordance with the present invention.
Figure 4:
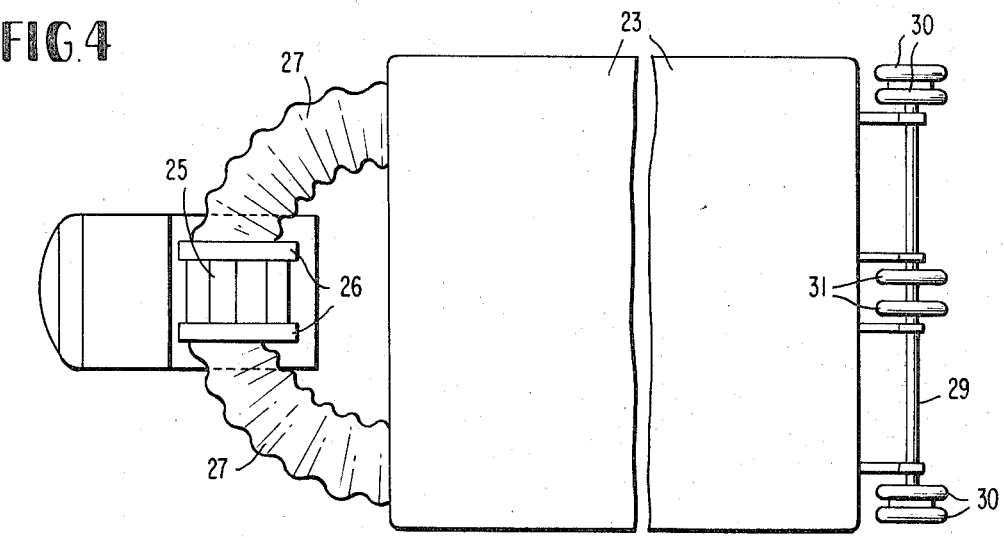
FIG. 4 is a schematic top plan view of the vehicle according to FIG. 3.

The vehicle according to FIGS. 3 and 4 has in principle the same construction. It differs from the embodiment of FIGS. 1 and 2, however, in that in this embodiment the load carrier 23 has a considerably greater width than the driving tractor 24 which in its turn is constructed as three-axle vehicle. An internal combustion engine 25 of relatively greater power rating is arranged on the tractor 24 transversely with respect thereto which drives on both sides thereof one blower 26 each. A hose 27 leads from each blower 26 to the load carrier 23 which is again provided in the manner described hereinabove with a rubber apron at the circumference thereof.

With the load carrier 23 of this embodiment, the support members in front and to the rear are constructed as double axles with rollers or wheels 28. The construction of the trailing axle 29 corresponds to that of FIGS. 1 and 2, however, the trailing axle 29 may be constructed in this embodiment as triple-track or quadruple-track axle, i.e., in addition to the outer double wheels 30 a central wheel pair 31 may additionally be provided whereby all wheels are equipped with conventional brakes.

The load carrier 12 or 23 can be moved with relatively slight tractional forces by the driving tractor suitable for cross-country drive and can also be steered and parked extraordinarily easily. When driving straight, the trailer axle 13, 29 assures for a corresponding guidance.

While I have shown and described only two embodiments in accordance with the present invention, it is understood that the present invention is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

What I claim is:

1. A semitrailer-like motor vehicle for transporting loads, characterized in that a load carrier means is constructed as air cushion vehicle, and in that a driving vehicle means includes a blower means driven from an internal combustion engine producing the pressurized air for the air cushion of the load carrier means, and connecting means connecting the driving vehicle means with the load carrier means in such a manner that the pressurized air and driving forces can be transmitted, the load carrier means also including a trailing axle means, and in that the connecting means includes hose connections transmitting the pressurized air which serve simultaneously for the transmission of tractional and braking forces.

2. A semitrailer-like motor vehicle for transporting loads, characterized in that a load carrier means is constructed as air cushion vehicle, and in that a driving vehicle means includes a blower means driven from an internal combustion engine producing the pressurized air for the air cushion of the load carrier means, and connecting means connecting the driving vehicle means with the load carrier means in such a manner that the pressurized air and driving forces can be transmitted, the load carrier means also including a trailing axle means and in that the trailing axle means is guided at the rear end of the load carrier means by guide means and is spring supported with respect to the load carrier means and equipped with brakes at the wheels thereof.

3. A semitrailer-like motor vehicle according to claim 2, characterized in that the load carrier means is substantially wider than the driving vehicle means and the trailing axle means is of multi-track construction.

4. A semitrailer-like motor vehicle for transporting loads comprising a driving vehicle means including an internal combustion engine and first means driven by said internal combustion engine for producing pressurized air; air cushion load carrier means for supporting a transported load, said air cushion load carrier means being activated into an air cushion support upon the production of pressurized air; second means for connecting one end of the air cushion load carrier means with the driving vehicle means such that said driving vehicle means moves said air cushion load carrier means, said second means being means for transmitting said pressurized air to said air cushion load carrier means; and trailing axle means spaced from and secured to said air cushion load carrier means at an opposite end to said one end of said air cushion load carrier means for guiding said opposite end of said air cushion load carrier means upon the activation of the air cushion support.

5. A semitrailer-like motor vehicle according to claim 4, wherein said first means includes a blower means.

6. A semitrailer-like motor vehicle according to claim 4, wherein said air cushion load carrier means supports said transported load above ground terrain with slight ground pressure.

7. A semitrailer-like motor vehicle according to claim 6, wherein said trailing axle means assist the air cushion support in supporting the transported load.

8. A semitrailer-like motor vehicle according to claim 4, wherein said second means are detachable from said vehicle driving means.

9. A semitrailer-like motor vehicle according to claim 4, wherein said trailing axle means assist the air cushion support in supporting the transported load.

10. A semitrailer-like motor vehicle for transporting loads comprising a driving vehicle means including an internal combustion engine and first means driven by said internal combustion means for producing pressurized air; air cushion load carrier means for supporting a transported load, said air cushion load carrier means being activated into an air cushion support upon the production of pressurized air; second means for connecting one end of the air cushion load carrier means with the driving vehicle means such that said driving vehicle means moves said air cushion load carrier means; and trailing axle means spaced from and secured to said air cushion load carrier means at an opposite end to said one end of said air cushion load carrier means for guiding said opposite end of said air cushion load carrier means upon the activation of the air cushion support, and wherein said second means includes a spring bellows connecting hose transmitting pressurized air between said first means and said air cushion load carrier means, said connecting hose simultaneously transmitting tractional and braking forces to said air cushion load carrier means.

11. A semitrailer-like motor vehicle according to claim 4, wherein said air cushion load carrier means has a substantially flat loading surface and a circumferentially extending apron means of elastic material, and wherein said air cushion load carrier means includes at least at said one end opposite the trailing axle means, support means for supporting said air cushion load carrier means when the semitrailer-like motor vehicle is at rest.

12. A semitrailer-like motor vehicle according to claim 11, wherein said support means are provided with brakes.

13. A semitrailer-like motor vehicle according to claim 12, wherein said support means are rollers.

14. A semitrailer-like motor vehicle according to claim 12, wherein said support means are wheels.

15. A semitrailer-like motor vehicle according to claim 11, wherein said trailing axle means are spring supported with respect to said air cushion load carrier means and include wheels equipped with brakes.

16. A semitrailer-like motor vehicle according to claim 15, wherein said trailing axle means is substantially as wide as said cushion load carrier means.

17. A semitrailer-like motor vehicle according to claim 4, wherein said trailing axle means are spring supported with respect to said air cushion load carrier means and include wheels equipped with brakes.

18. A semitrailer-like motor vehicle according to claim 17, wherein said trailing axle means guides said opposite end of said air cushion load carrier means and assists the air cushion support in supporting the transported load above ground terrain with slight ground pressure.

19. A semitrailer-like motor vehicle according to claim 4, wherein said internal combustion engine drives said driving vehicle means.

20. A semitrailer-like motor vehicle for transporting loads comprising a driving vehicle means including an internal combustion engine and first means driven by said internal combustion engine for producing pressurized air; air cushion load carrier means for supporting a transported load, said air cushion load carrier means being activated into an air cushion support upon the production of pressurized air; second means for connecting one end of the air cushion load carrier means with the driving vehicle means such that said driving vehicle means moves said air cushion load carrier means; and trailing axle means spaced from and secured to said air cushion load carrier means at an opposite end to said one end of said air cushion load carrier means for guiding said opposite end of said air cushion load carrier means upon the activation of the air cushion support, wherein said air cushion load carrier means has a substantially flat loading surface and a circumferentially extending apron means of elastic material and said air cushion load carrier means including at least at said one end opposite the trailing axle means support means for supporting said air cushion load carrier means when the semitrailer-like motor vehicle is at rest, wherein said trailing axle means are spring supported with respect to said air cushion load carrier means and includes wheels equipped with brakes, and wherein said air cushion load carrier means is substantially wider than the driving vehicle means and the trailing axle means is of multi-track construction.

21. A semitrailer-like motor vehicle according to claim 20, wherein said internal combustion engine is a transversely arranged driving engine with relatively high power output arranged on the driving vehicle means for driving two blower means, and wherein a hose connection leads from each blower means to the air cushion load carrier means.

22. A semitrailer-like motor vehicle according to claim 21, wherein the driving vehicle means is a towing tractor.

23. A semitrailer-like motor vehicle according to claim 21, wherein said second means are detachable from said driving vehicle means.

24. A semitrailer-like motor vehicle according to claim 21, wherein said second means includes a spring bellows connecting hose transmitting pressurized air between said first means and said air cushion load carrier means, said connecting hose simultaneously transmitting tractional and braking forces to said air cushion load carrier means.

25. A semitrailer-like motor vehicle according to claim 21, wherein said support means are provided with brakes.

* * * * *